Figure 1:
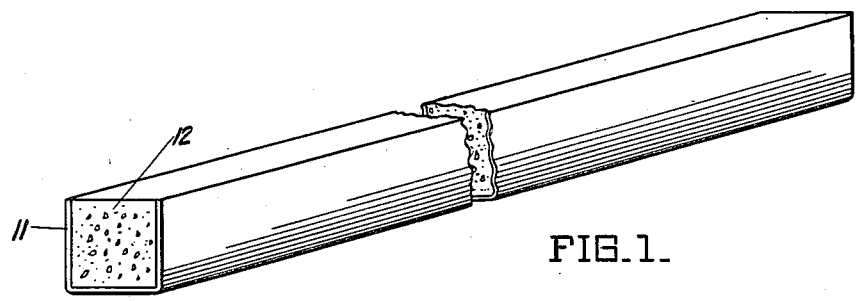

Nov. 29, 1927.

O. L. MILLS

WELDING ROD

Filed Dec. 21, 1925

1,650,905

INVENTOR
Oscar L. Mills
BY
John Flam
HIS ATTORNEY

Patented Nov. 29, 1927.

1,650,905

UNITED STATES PATENT OFFICE.

OSCAR L. MILLS, OF LOS ANGELES, CALIFORNIA.

WELDING ROD.

Application filed December 21, 1925. Serial No. 76,836.

This invention relates to the art of welding, and more particularly to welding rods. Such rods are used for example in electrical welding, as one of the electrodes for the arc by the aid of which such rods are fused, and welding thus accomplished; or in fact, the rods can be used in oxy-acetylene welding. Such rods are melted by the heat from whatever source derived, the material from which they are made is caused to adhere closely to the work. For example, welding rods are in common use to build up worn parts, such as bits used in well drilling equipment; or to repair broken parts by furnishing a molten material fusing the parts together upon solidification; or to repair other defects, such as sometimes occur in castings of iron or steel.

It is one of the objects of my invention to make it possible to supply rods of this character that fulfill their function in a highly satisfactory manner, and that can be constructed inexpensively.

It is another object of my invention to provide in general an improved welding rod.

Although in its broader aspects, my invention is applicable to all types of rods, it is more particularly concerned with the welding of cast iron. It has been proposed in the past to utilize rods of ordinary cast iron as an electrode for welding or for building up defective or worn castings; but such rods are not universally applicable, because it is difficult to secure a good molecular union; and especially since a fluxing element must be used to ensure proper fusing of the metal. It is accordingly another object of my invention to provide a composite rod capable of being used for repairing or building up cast iron in a more convenient and efficient manner.

It is still another object of my invention to provide a novel composition that is capable of being used in a welding rod. In this connection, I have developed a novel and useful process of manufacturing such welding rods, particularly rods used in connection with cast iron by which process it is possible to utilize material otherwise wasted.

It is still another object of my invention to make it possible to deposit a metallic composition by welding, which has the physical and chemical characteristics of soft and fine-grained cast iron, and to vary this composition to secure any grade of "cast iron" desired.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Figure 2:
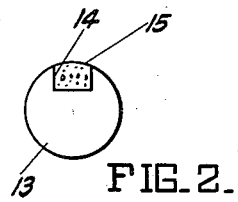
Figure 3:
Figure 4:

Referring to the drawings:

Figure 1 is a perspective view of one form of rod constructed in accordance with my invention; and Figs. 2, 3, and 4 are end views of other forms of rods that embody my invention.

It is one of the features of my invention that by its aid, it is practicable to supply the material to be fused with the work in a very convenient manner. For this purpose, a composition is first made up, comprising the materials found to be advantageous for forming the welding rod; and since such composition is preferably in the form of a mixture including divided metallic or alloying particles, I provide a receptacle for the composition, such as shown at 11, Fig. 1. This receptacle in this instance is in the form of a rectangular trough of just sufficient thickness to impart rigidity to the bar, and so that its volume does not materially alter the composition of the complete bar. Sheet metal of about 30 mils thickness can be used for this receptacle, and it may be copper or brass, or iron. The container 11 can also be formed by stamping, rolling, forging or drawing. The composition 12 can be placed in the receptacle 11 while the composition is in a plastic state. This composition can be such as to provide a wearing layer of high grade alloy steel, when welded on worn cutting tools, such as on well drill bits; or on the other hand, it can be such as to provide a fine-grained alloy of the physical composition of ordinary cast iron, for repairing or building up iron castings. In that case, the container 11 should of course be made of iron or steel.

The important feature of the rod as thus far described is that a metallic shell or vehicle is used for holding a welding composition, whereby such a welding composition can be conveniently applied. The bar or rod can be fused either by the aid of an electric current, forming an arc between it and the work, or by other means, such as an oxyacetylene flame. Of course my invention is not limited to the precise form of container for the composition; in fact, in some instances the container itself enters materially into the ultimate composition of the matter welded. Such a bar is shown in end elevation in Fig. 2, wherein the container bar 13 may be of low grade carbon steel, and may have a groove or recess 14 formed in it by rolling, drawing or milling, in which groove the composition 15 can be accommodated. The composition can be such as to alloy with the bar 13 when welded, to form a high grade steel alloy, such as tungsten steel, nickel chromium steel, or vanadium steel.

Still other forms of convenient containers can be used. In Fig. 3 a hollow tube 16 is shown, utilized for this purpose; and in Fig. 4, a triangular trough 17.

One of the most important features of my invention resides in the application of such forms as shown to the provision of rods for welding cast iron, and especially the provision of such composition rods that contain the necessary flux for welding. The manner for manufacturing such a rod will now be described in detail.

In order to maintain the material for the rods at minimum expense, I make use of cast iron borings or chips, which are cut from castings in the process of machining them. Such material can be obtained for little, for machine shops are usually hampered with their disposal. But no matter from what source obtained, I first of all grind the cast iron to small particles, to pass through a 20 mesh screen or finer, depending upon the ultimate size of the rods to be constructed. I then mix this granular material with a small proportion of other materials in accordance with the desired composition of the iron desired to be deposited. For example, if silicon, manganese, phosphorus, sulphur or vanadium are to be added, this can conveniently be accomplished by the addition of fine particles (60 mesh or finer) of ferrosilicon, ferromanganese, ferrophosphorus, or ferrovanadium. Carbon can also be added in any desired form; such as graphite, coke dust, bone black or lamp black. A small proportion of slag forming elements, such as aluminum and magnesium, can also be added, in order to assist in the carrying off of all of the undesired impurities.

To this mixture of granular particles, there is added a binder, preferably carbonaceous, for holding the material together. Examples of such binders are linseed oil, fish oil, molasses, glue, resin, or flour paste. Enough of the binder should be used to make a thick paste after thorough mixing of all of the materials. It is of course permissible to use other kinds of binders, such as sodium silicate, although a carbonaceous binder is preferred.

Due to the addition of such materials as ferrosilicon and ferrophosphorus in the composition, the weld takes place without material danger of any substantial chemical union between the carbon and the iron to form a hard compound. The carbon is added to compensate for the carbon that is lost during the weld. The carbonaceous binder also assists in this function, and at the same time keeps the rod free from harmful ingredients that are present in other forms of binders.

In order to provide a flux for the materials, a small percentage of any appropriate material in a finely divided state can be incorporated in the mixture. Examples are fluor spar, carbonate of soda, or bicarbonate of soda. The proportions in the mixture are from about one to four per cent.

After this paste is thoroughly mixed, it can be put into the container 11, 16, or 17 such as shown in the drawings, and then finally baked for a sufficient time to stiffen and harden the composition. The rod is then ready for use in the well known manner, without the aid of additional fluxes or the like.

I claim:

1. A welding rod comprising a metallic container, and a homogeneous welding composition in the container, said composition containing substantially all of the materials to be deposited by the weld.

2. A welding rod for depositing an alloy having the composition of cast iron, comprising a thin metallic container having an axial groove or trough therein, and a homogeneous composition of flux and of the allow constituents in said recess.

3. A composition for use in welding and for depositing by welding, an alloy having the composition of cast iron, comprising a homogeneous mixture of cast iron particles, a binder, and a flux.

4. A welding composition, comprising cast iron particles, finely divided alloying materials of such proportions as required in the final product produced by welding, a binder and a small percentage of fluxing material.

5. A welding composition, comprising cast iron ground to a fineness capable of passing through a screen no coarser than 20 mesh, finely divided alloying materials capable of passing through a screen no coarser than 60 mesh, and of an amount sufficient to produce the desired ultimate alloy, a binder sufficient to make a thick paste of the cast iron and alloying materials, and a finely divided flux of between one and four percent of the entire composition.

6. The process of manufacturing a welding composition, which comprises disintegrating cast iron borings to granular fineness, mixing with these particles, finely divided alloying material and a fluxing material, making a thick paste of the above by the aid of a binder, and baking until stiffness and hardness is secured.

7. A welding composition, comprising a homogeneous mixture of a metal, alloying materials entering into the weld, and a carbonaceous binder.

8. A welding composition, comprising a homogeneous mixture of cast iron particles, ferrophosphorous, and a carbonaceous binder.

9. A welding rod for depositing an alloy having the composition of cast iron, comprising a thin metallic container, and a welding composition therein including cast iron particles, and a carbonaceous binder.

In testimony whereof I have hereunto set my hand.

OSCAR L. MILLS.